Nov. 21, 1950   H. GANG   2,531,205
CONSTANT FACTOR MEANS

Filed Feb. 16, 1948   15 Sheets-Sheet 1

INVENTOR
Herman Gang,
BY
C.W. Anderson & Son
ATTORNEYS

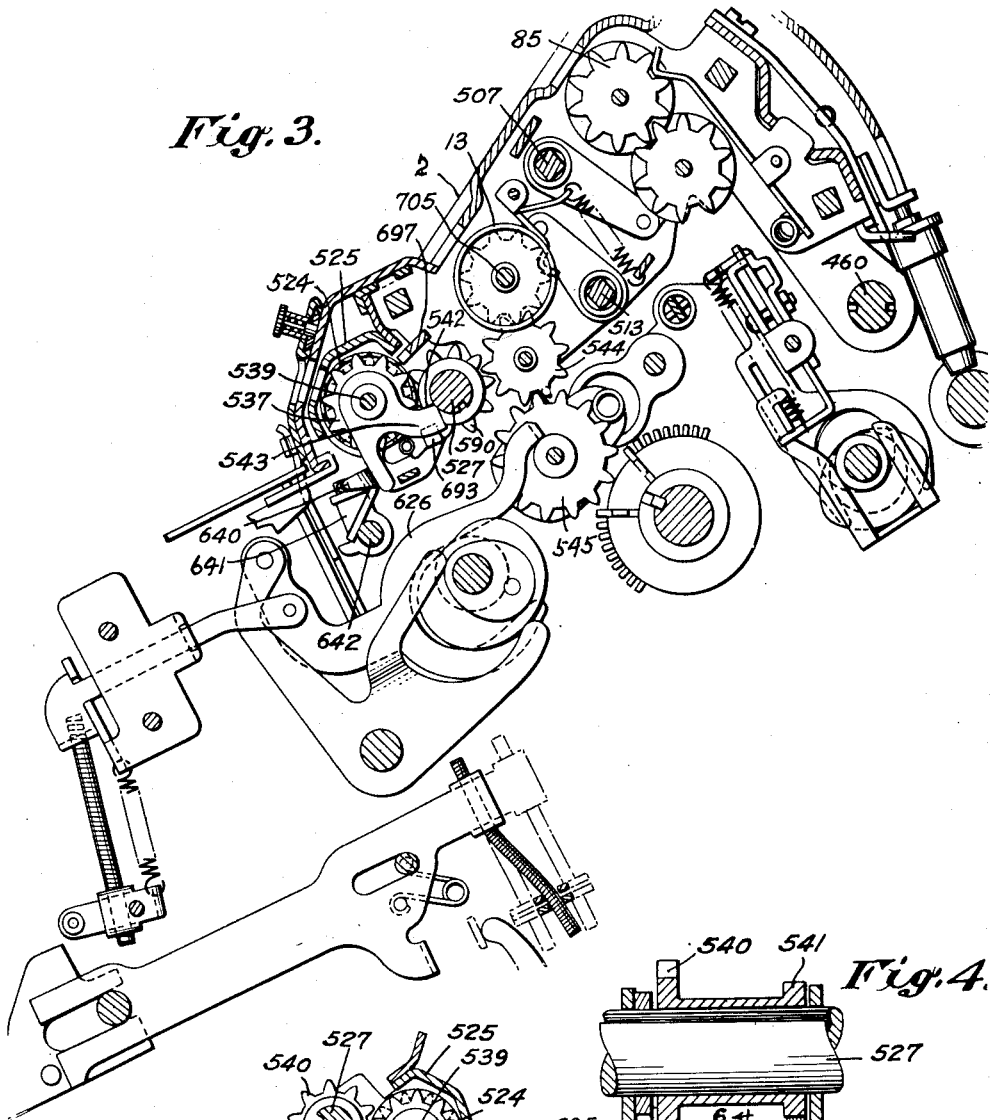
Fig. 3.
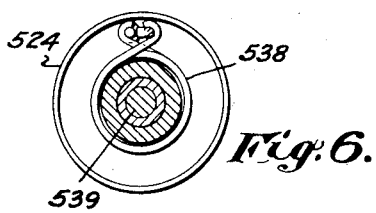
Fig. 5.
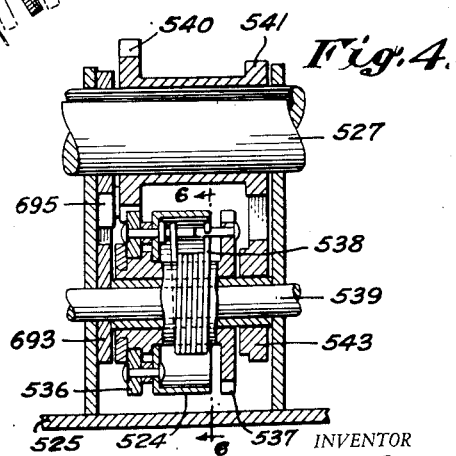
Fig. 4.
Fig. 6.
INVENTOR
Herman Gang,
BY E. W. Anderson & Son
ATTORNEYS Nov. 21, 1950          H. GANG          2,531,205

CONSTANT FACTOR MEANS

Filed Feb. 16, 1948          15 Sheets-Sheet 5

INVENTOR
Herman Gang,
BY
E. W. Anderson & Son
ATTORNEYS

Nov. 21, 1950   H. GANG   2,531,205
CONSTANT FACTOR MEANS
Filed Feb. 16, 1948   15 Sheets-Sheet 9

INVENTOR
Herman Gang,
BY
E. W. Anderson & Son
ATTORNEYS

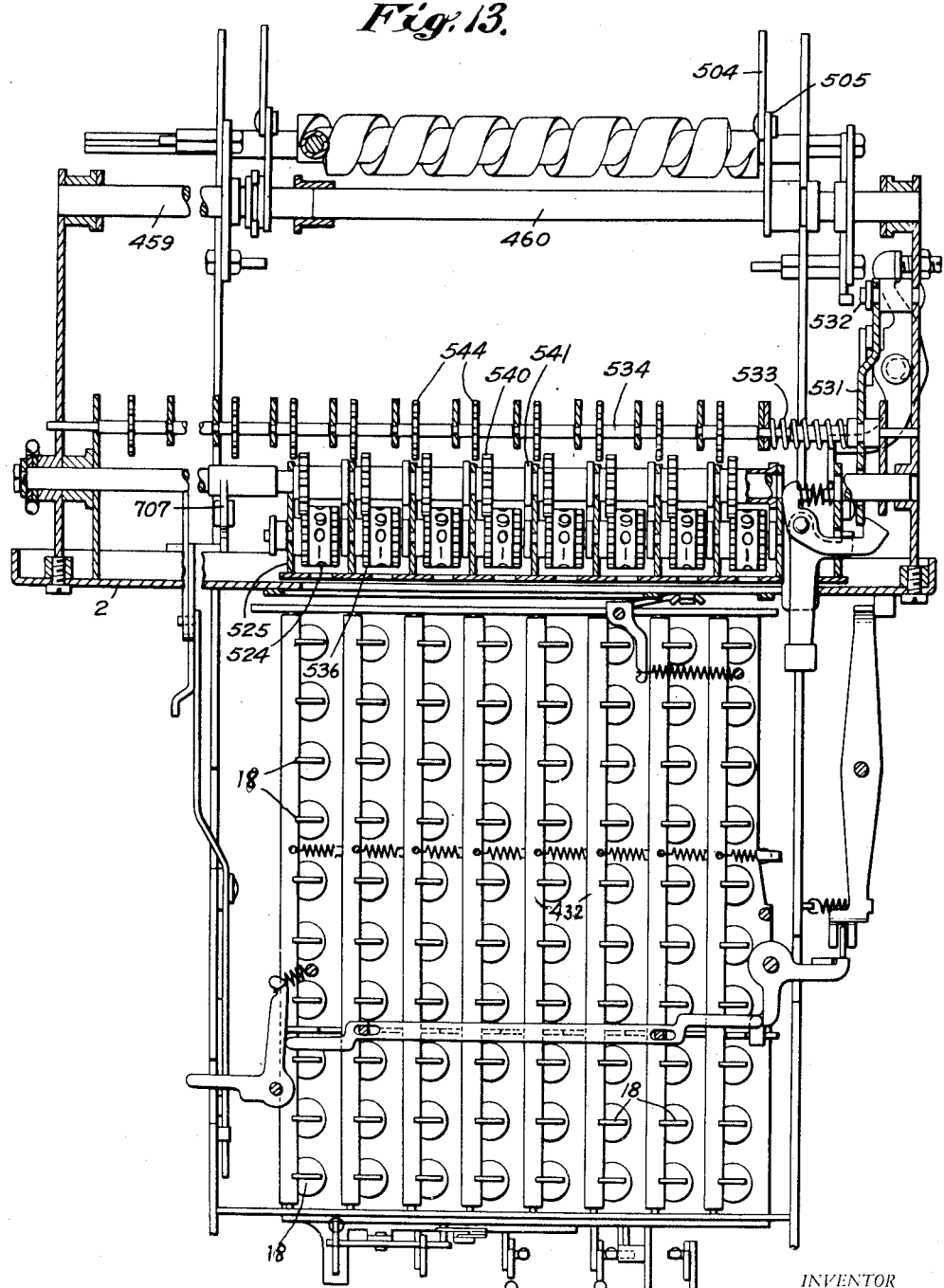

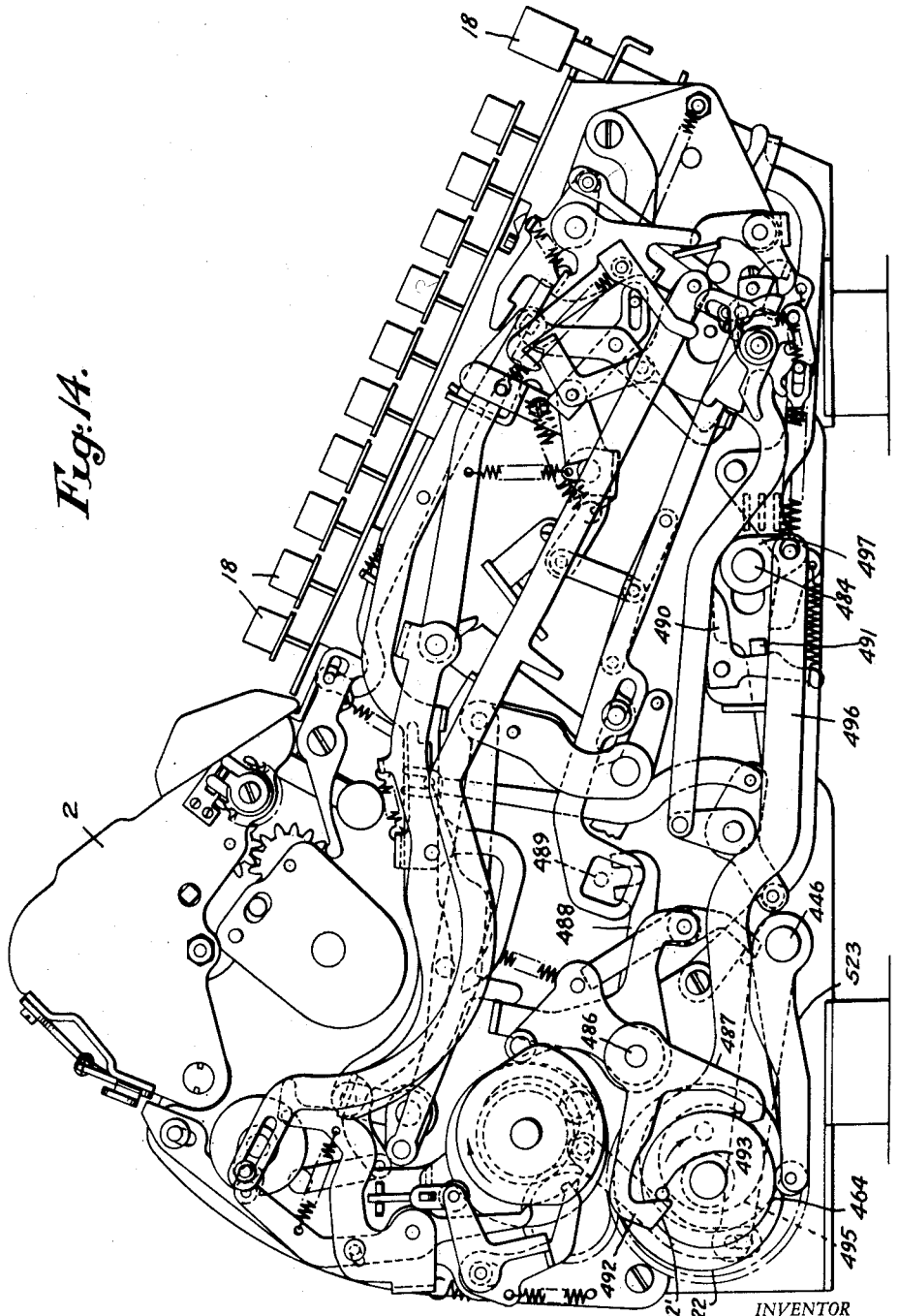

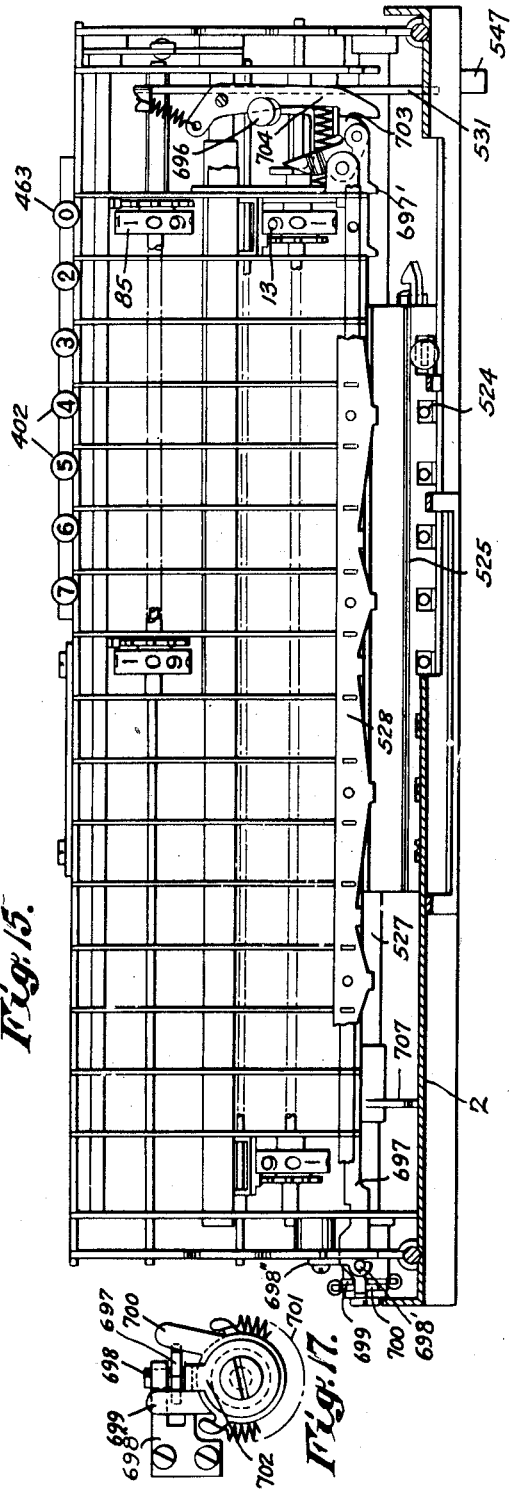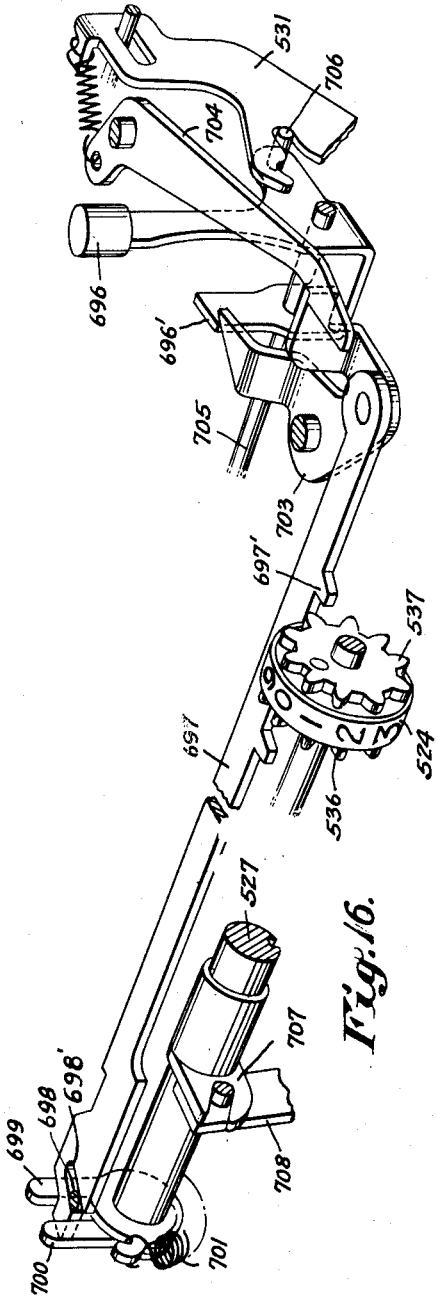

Nov. 21, 1950 H. GANG 2,531,205
CONSTANT FACTOR MEANS
Filed Feb. 16, 1948 15 Sheets-Sheet 13

INVENTOR
Herman Gang,
BY
C.W. Anderson & Son.
ATTORNEYS

Nov. 21, 1950 H. GANG 2,531,205
CONSTANT FACTOR MEANS
Filed Feb. 16, 1948 15 Sheets-Sheet 15

INVENTOR
Herman Gang,
BY
E.W Anderson & Son
ATTORNEYS

Patented Nov. 21, 1950

2,531,205

UNITED STATES PATENT OFFICE 2,531,205

CONSTANT FACTOR MEANS

Herman Gang, Livingston, N. J., assignor to Monroe Calculating Machine Company, Orange, N. J., a corporation of Delaware Application February 16, 1948, Serial No. 8,545

11 Claims. (Cl. 235—79)

The invention relates to calculating machines, and has for an object to provide improved means for restoring multiplier values to denominational multiplier storage devices of the denominationally shiftable carriage of the machine for use as a constant factor in a program of multiplication. Another object is to effect this restoration simultaneously with the clearing of the product register of the machine. Another object is to effect this restoration simultaneously with the clearing of the product and/or another register or registers of the machine. Other objects and advantages will appear hereinafter or will be obvious.

The invention consists in the novel construction and combinations of parts as hereinafter set forth in the claims.

In the accompanying drawings,

Figure 3 is a detail vertical section through the main carriage and adjacent parts, showing the multiplier storage devices and the counting finger therefor.

Figure 4 is an enlarged detail horizontal section taken through one of the multiplier storage wheels and gears.

Figure 5 is a detail vertical section through the sub-carriage, showing the pawls for holding the multiplier storage wheels and gears in adjusted position and the cams for releasing said pawls.

Figure 6 is a detail section on the line 6—6, Fig. 4, showing a centralizing spring for a multiplier storage wheel.

Figure 13 is a partial section taken substantially on the line 13—13, Fig. 8, showing the multiplier storage devices and the keyboard with the cover plate and key buttons removed.

Figure 14 is a left side elevation of the machine, showing the parts in normal position.

Figure 15 is a plan view, partially in section, of the main carriage, showing the latching comb and the subcarriage in adjusted position.

Figure 16 is a detail perspective view of a multiplier storage wheel, the latching comb therefor and parts associated therewith.

Figure 17 is a detail left end view of the parts shown in Fig. 16.

Upper dial, lower dial and keyboard clearout mechanism

Figure 1:
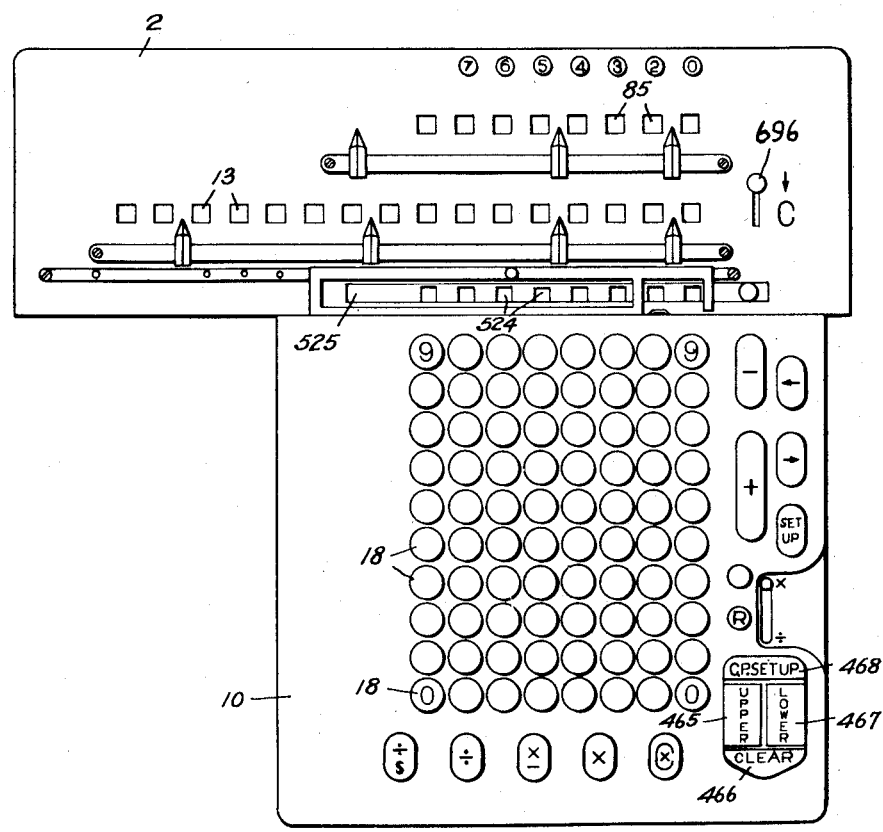
Figure 1 is a plan view of a calculating machine embodying the invention.
Figure 9:
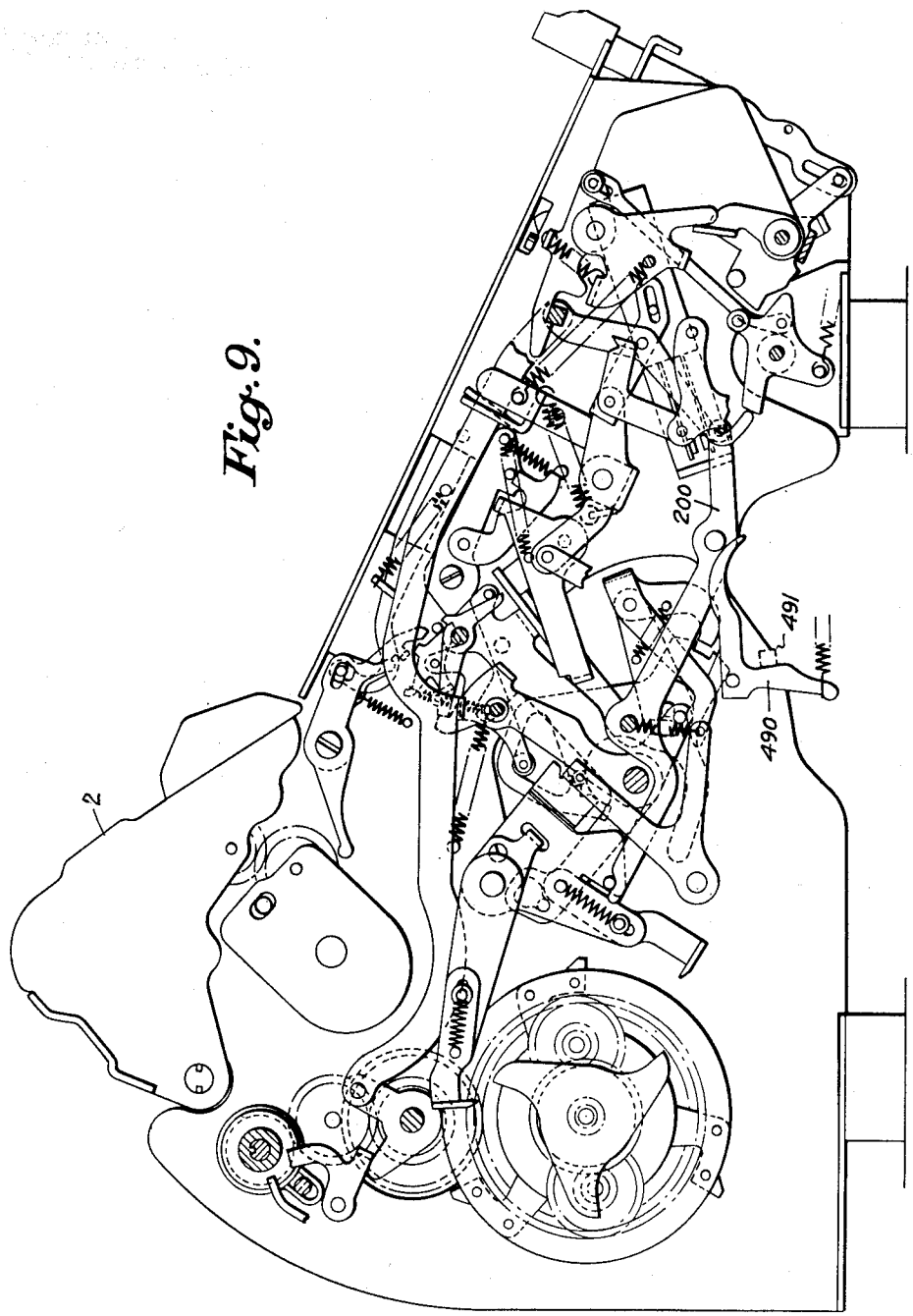
Figure 9 is a left side elevation of the machine, showing the switch control means for the clearout clutch.
Figure 10:
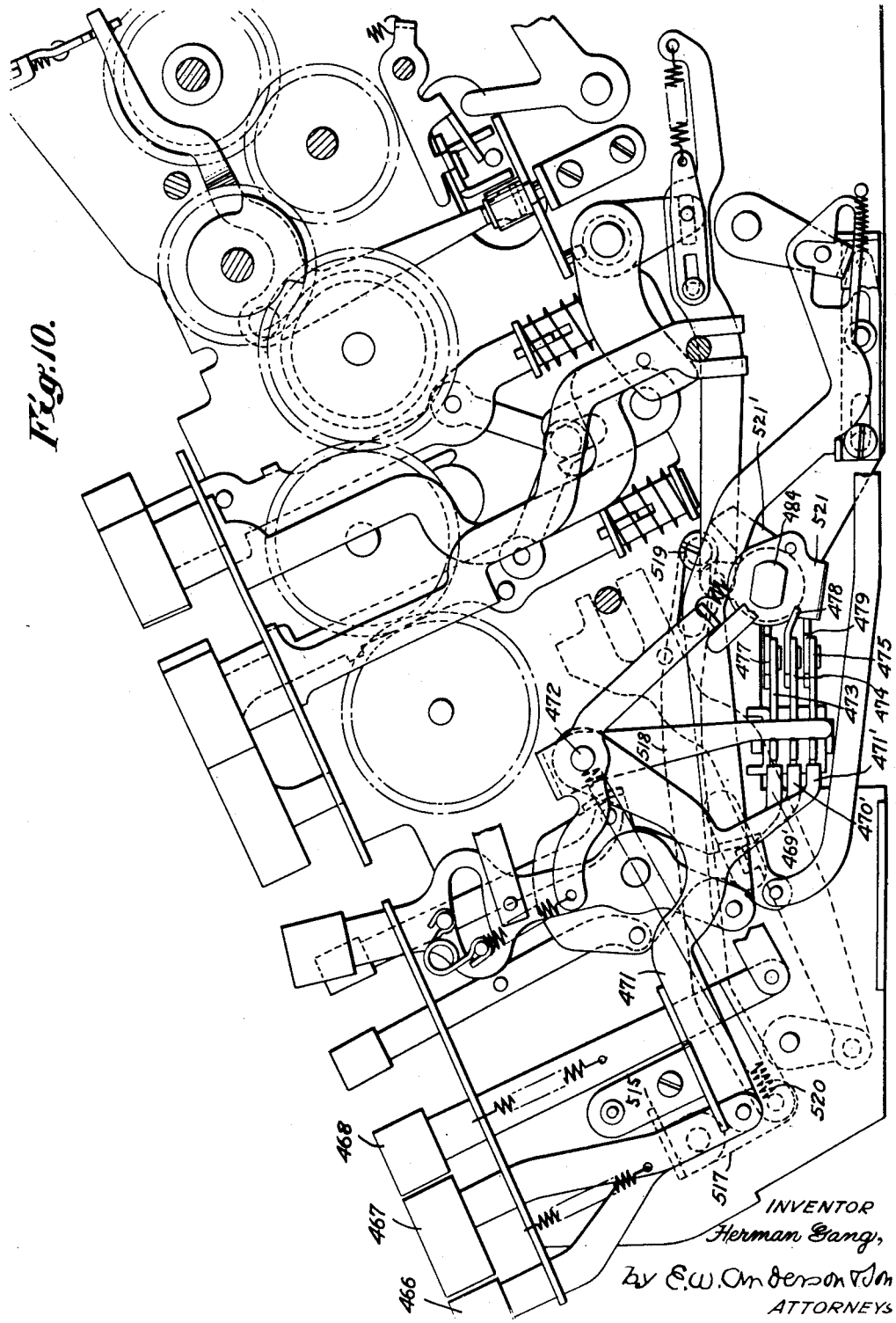
Figure 10 is an enlarged right side elevation of the machine, showing portions of the controls for the clearout mechanism.
Figure 12:
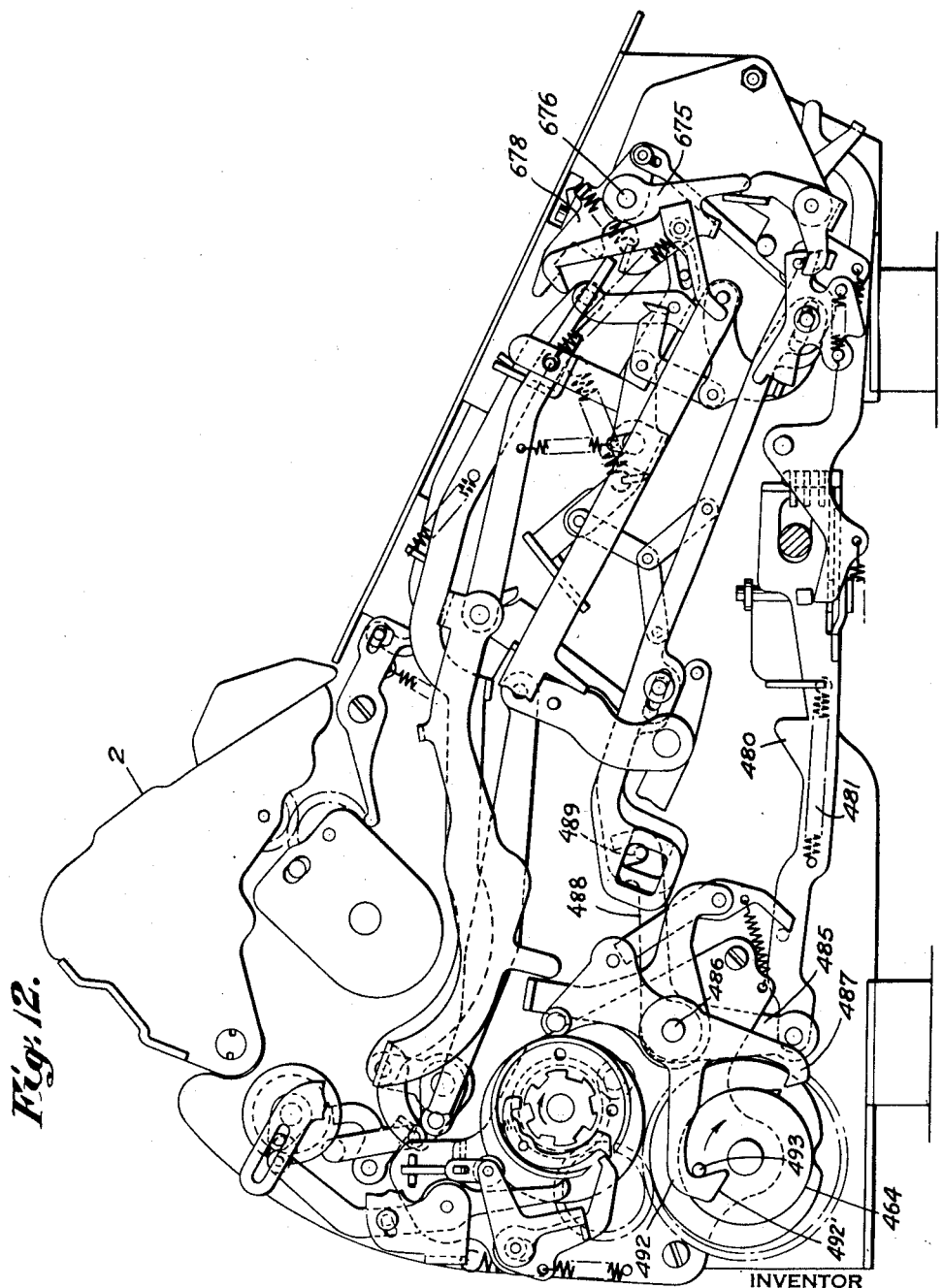
Figure 12 is a left side elevation of the machine, showing the clearout clutch and certain mechanisms associated therewith.
Figure 18:
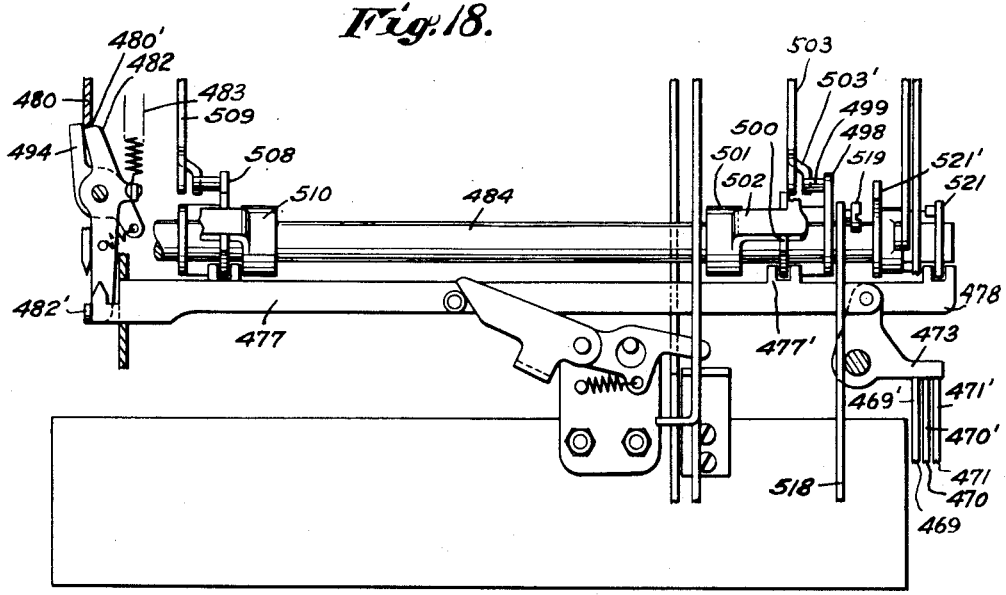
Figure 18 is a fragmentary plan view of certain portions of the clearout mechanism.
Figure 19:
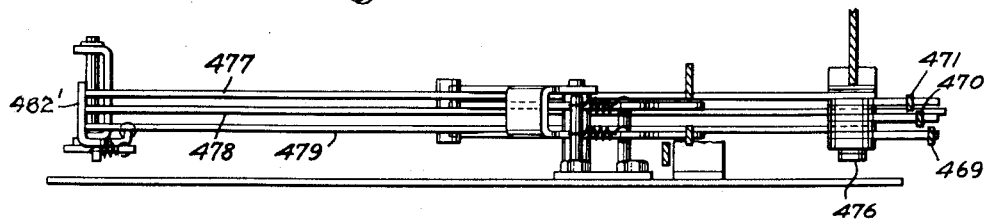
Figure 19 is a front elevation of the parts shown in Fig. 18.
Figure 20:
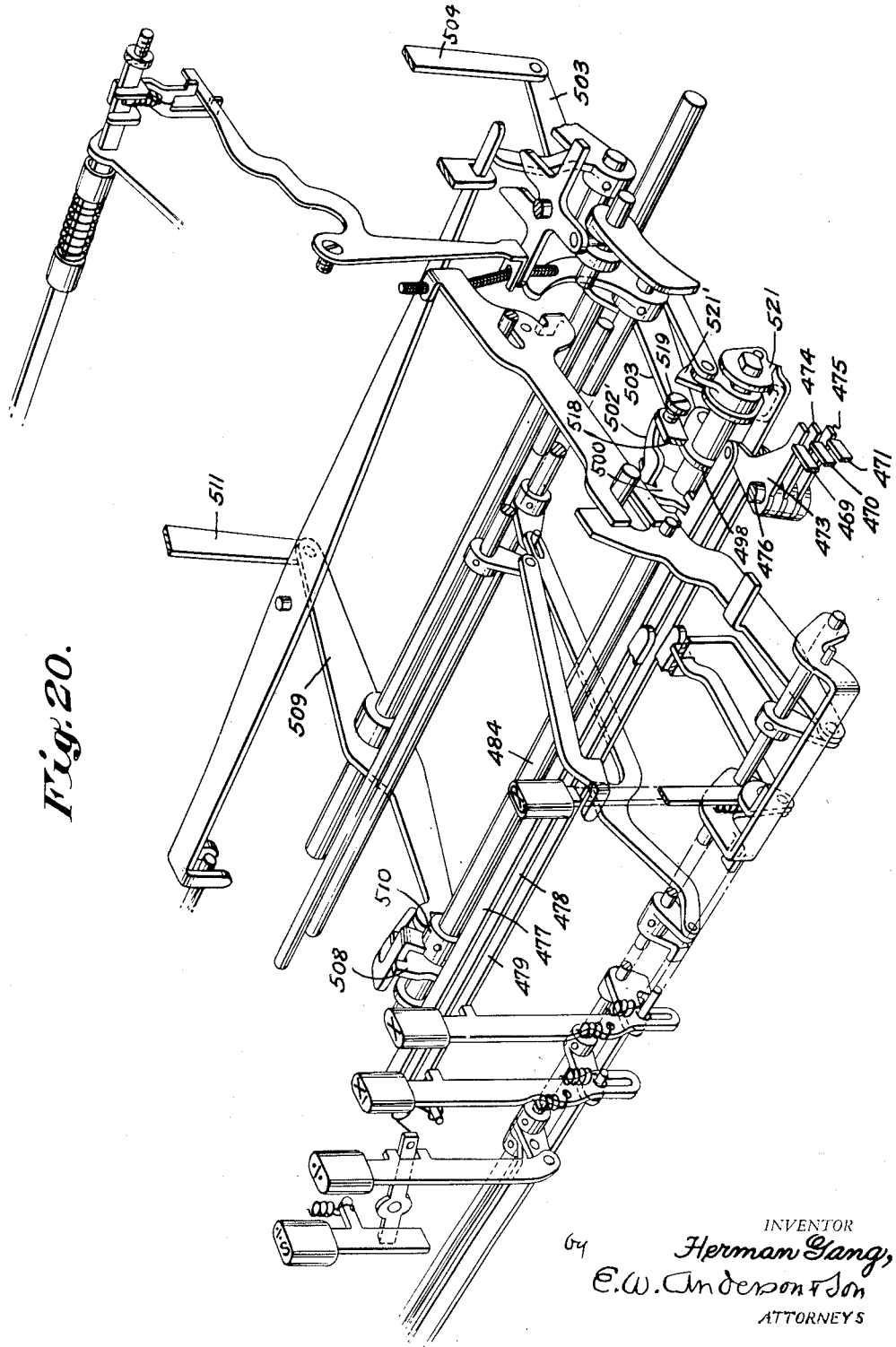
Figure 20 is a perspective view, with certain parts in exploded relationship, showing portions of the clearout mechanism and controls therefor.

The machine is provided with a one cycle clutch 464 (Figs. 12 and 14) which is selectively operated to return to zero the upper dials 85 comprising the multiplier-quotient register, the lower dials 13 comprising the dividend-product register, or to restore keys 18 which may be set on the keyboard 10. An upper dial clear key 465, a lower dial clear key 467 and a keyboard clear key 466 are grouped on the lower right hand side of the keyboard 10 (Fig. 1). The depression of any one of the keys 465, 466, or 467 serves to engage the clutch 464 and to select the operation it will perform. The keys, however, are adapted to be depressed simultaneously, whereby the clutch 464 will operate a single cycle to simultaneously clear the indicated dials and/or keyboard as follows:

Each of the stems of the clear keys 465, 466 and 467 is pivotally connected at its lower end to the forward ends respectively of levers 469, 470 and 471 which are fulcrumed, one behind the other, at their rear on a stud 472 fixed on the right hand side frame. Lever 471 is shown in its entirety in Figure 10 and levers 469 and 470 are of like configuration. The levers 469, 470 and 471 are provided with depending arms which terminate in horizontally disposed fingers 469', 470' and 471' respectively, which are adapted for contact each with an arm of bell crank levers 473, 474 and 475 respectively. The bell crank levers are fulcrumed on a vertical shaft 476, Figure 19, suitably fixed and depending from a cutout section of the right hand side frame. The bell crank levers 473, 474 and 475 are pivotally connected to slides 477, 478 and 479 respectively which slides extend across the machine (Figs. 18, 19 and 20). Thus depression of any one of the clear keys 465, 466 or 467 will rock its associated lever counterclockwise (Fig. 10) about the stud 472 and the finger 469', 470' or 471' will rock bell crank levers 473, 474 or 475 counterclockwise, thus moving slide 477, 478 or 479 to the left. The movement of any one of the slides to the left either singly or simultaneously with either one or both of the other slides releases a double latch 482, Figure 18, which allows the clearout clutch 464 to be engaged and selects the operation or operations to be powered by the clearout clutch. The double latch 482 which is normally in engagement with a shoulder 480' of a slide 480 (Figs. 12 and 18), holds said slide in its rearward position against the tension of a spring 481. The slide 480 is slidably supported at its forward end on a shaft 484 which extends across the machine and projects externally of the left hand side frame and is pivotally connected at its rearward end to an arm 485 fixed on shaft 486 which shaft is rotatably mounted in the side frame. The leftward ends of slides 477, 478 and 479 are in abutment with an upstanding ear 482' of latch 482 (Figs. 18 and 19). Thus movement of one or more of the slides to the left will rock latch lever 482 clockwise about its fulcrum against tension of spring 483, releasing slide 480 which will be pulled forward by its spring 481. The left hand ends of the slides 477, 478 and 479 are each provided with a recess and when a slide 477, 478 or 479 is moved to its active position, the forward end of released slide 480 will enter such recess and hold the slide 477, 478 or 479 in set position until the engaging end of slide 480 has been removed, when said slide 477, 478 or 479 will be restored to latched position. Clearout clutch 464 (Fig. 12) is driven by a suitable gear train from the electric motor and is of well-known construction in which a spring pawl mounted on the driven member of the clutch is held out of engagement with the driving member by a detent. For this purpose a detent 487 (Figs. 12 and 14) is fixed on shaft 486 and when the slide 480 is released and pulled forward by its spring, the shaft 486 through arm 485 will be rocked counterclockwise thus removing detent 487 from engagement with the pawl of clutch 464, thereby engaging the drive to the motor (Figs. 12 and 14). Upon engagement of the clearout clutch the circuit breaker for the electric motor must be closed. For this purpose, a lever 490 (Fig. 9), pivotally mounted on the frame is urged counterclockwise by a suitable spring. A horizontally disposed arm of the lever 490 is in contact with a pin on the arm 200 (Figs. 9 and 14) and the lever is restrained from rotation by a lug 491 on the slide 480 in blocking contact with a depending arm of the lever 490. When the slide 480 is released to move forward, the lever 490 is urged counterclockwise by its spring and the forward end of lever 200 is lifted to close the circuit breaker.

In order that the clutch 464 shall make one cycle of operation and then be disengaged, provision is made to return the detent 487 into position to engage the pawl of the clutch before the clutch has completed its cycle. To this end, the detent 487 is provided with an extension arm 492 (Figs. 12 and 14), the free end of which is provided with a cam face 492'. When the detent 487 is disengaged (Fig. 12), the free end of the arm 492 is moved downwardly, thus bringing the cam face 492' into position to be engaged by a pin 493 mounted on the driven member of the clutch 464. As the clutch 464 approaches its full cycle position, the pin 493 will contact cam face 492' raising arm 492 and thus moving detent 487 into position where it will engage the pawl of the clutch 464 and disconnect the drive when the clutch reaches full cycle position. As the detent 487 is fast on shaft 486, the shaft will be rocked clockwise, carrying arm 485 with it and moving slide 480 to the rear. The pin 493 of clutch 464 will pass under the cam face 492', providing sufficient movement to bring the shoulder 480' of the slide 480 to the rear of the restraining arm of latch lever 482 (Fig. 18) which will be urged into latching position by spring 483. The slide 480 will then be urged forward by its spring into contact with the latch lever 482 and the arm 492 moved slightly downward (Figs. 14 and 18). The latch lever 482 operates as above described only if the clearout keys 465, 466 and 467 have been released before the completion of clearout cycle. If the clearout keys have been released, the ear 482' abutting the ends of the setting slides 477, 478 and 479 will move said slides to the right to their unset position. However, should a clear key be held depressed, a setting slide will be held to the left and by contact with ear 482' hold the latch lever in clockwise rocked position out of the path of the shoulder 480' of slide 480 (Fig. 18). In this instance, a latch lever 494 having a common fulcrum with latch lever 482 will be urged clockwise by spring connection with latch lever 482, thus positioning it in the path of the shoulder of slide 480 and preventing forward movement of the slide. When the clearout keys are released, the latch lever 482 will then be free to be moved counterclockwise by spring 483 and return the slides 477, 478 or 479 to normal. As latch lever 482 is moved counterclockwise, it will by contact with latch lever 494 move the latter out of latching engagement with slide 480 and itself be moved into latching position, thereby restraining said slide from forward movement (Fig. 18).

The clutch 464, during the foregoing cycle of operation, provides the power to operate the mechanism adjusted to active position by one or more of the setting slides 477, 478 and 479. To this end, the driven member of the clutch 464 is provided with an eccentric cam 495 (Fig. 14). The eccentric cam is adapted to impart a reciprocatory movement to a link 496 which is attached at its forward end to a crank arm 497 which is fixed on the shaft 484 which extends across the machine (Figs. 18 and 20). Thus when clutch 464 is operated, the shaft 484 is rocked clockwise (Fig. 14), counterclockwise (Fig. 20) during the first half of the cycle and during the second half of the cycle is rocked back to normal.

Slidably mounted on shaft 484 and positioned to the left of the right hand side frame, is a rearwardly extending arm 498 (Figs. 18 and 20) having a pin 499 extending to the left thereof.

Integral with arm 498 and positioned to the left in spaced relationship thereto is a member 500 provided with an upstanding portion having an open-end slot. Further to the left and fixed on shaft 484, is a collar 501 provided with an arm 502 extending to the right thereof and seated in the open-end slot of member 500. Fulcrumed on shaft 466 is a lever 503 (similar to lever 509, Figure 2), the forward end of which is provided with an open-end slot the bottom of which is defined by an ear 503' which is offset to the right (Fig. 18). Normally the forward end of lever 503 is held downwardly by a rearwardly extending finger 502' (Fig. 20) of the extension 502 of collar 501, the pin 499 of lever 498 being positioned just above and out of contact with the ear 503'. However, depression of clearout key 465 for initiating the operation which will restore the upper dials 85 to zero, will, as heretofore described, move setting slide 477 to the left. Slide 477 (Fig. 18) is provided with a projection 477' (Figs. 18 and 20) having an open-end slot which engages the rim of member 500. Thus member 500 and arm 498 are moved to the left and the pin thereof into driving engagement with lever 503 through the slot in the forward end thereof. When shaft 484 is rocked by clearout clutch 464, arm 498 will therefore be rocked through arm 502 of collar 501 thus raising the forward end of the lever 503. The rearward end of lever 503 is pivotally connected to the bottom of a link 504 (Fig. 2) which is pivotally connected at its upper end to an arm 505 (Fig. 2) splined on the carriage shaft 460 and provided with a suitable bearing in the right hand side frame of the machine (Fig. 13). Thus as the rearward end of lever 503 is lowered, shaft 460 will be rocked clockwise and through suitable linkage 506, shaft 507 mounted in the carriage will likewise be rocked clockwise. The rocking of shaft 507 will serve to return to zero the wheels 85 (Fig. 3) in the manner fully disclosed in Patent No. 1,781,320 to L. P. Crosman. As shaft 484 is rocked clockwise back to normal, the pin of arm 498, by contact with ear 503', will move the forward end of lever 503 downwardly and at the end of the movement the finger 502' will further depress said lever, lowering ear 503' slightly below the pin 499 of arm 498, at which time slide 477 will be restored to its normal position if key 465 has been released. However, if key 465 is held depressed, the restoration of the slide will take place upon release of said key. Should one or the other of the setting slides 478 or 479 be moved to the left to initiate a cycle of clearout clutch 464 while slide 477 is in its normal position, the rocking movement of arm 498 will be ineffective to clear the wheels 85 as the pin of said arm is out of engagement with the slot on the forward end of lever 503.

The parts adjusted to active position by depression of key 467 and leftward movement of slide 479 for clearing the lower dials 13 to zero are of similar construction as that for the upper dials. An arm 508 (Figs. 2, 18 and 20) provided with a pin is moved into driving engagement with a lever 509 the lever being driven by an arm of a collar 510 which is fixed on shaft 484. The rearward end of lever 509 is pivotally connected to a link 511 (Figs. 2 and 11) which is pivotally connected to an arm 512 (Fig. 11) splined on the carriage shaft 459 and provided with a suitable bearing in the left hand side frame of the machine. Hence, when shaft 459 is rocked clockwise, shaft 513 will, through suitable linkage 514 likewise be rocked clockwise and the wheels 13 (Fig. 3) will be zeroized in accordance with the above-mentioned Patent No. 1,781,320.

Figure 7:
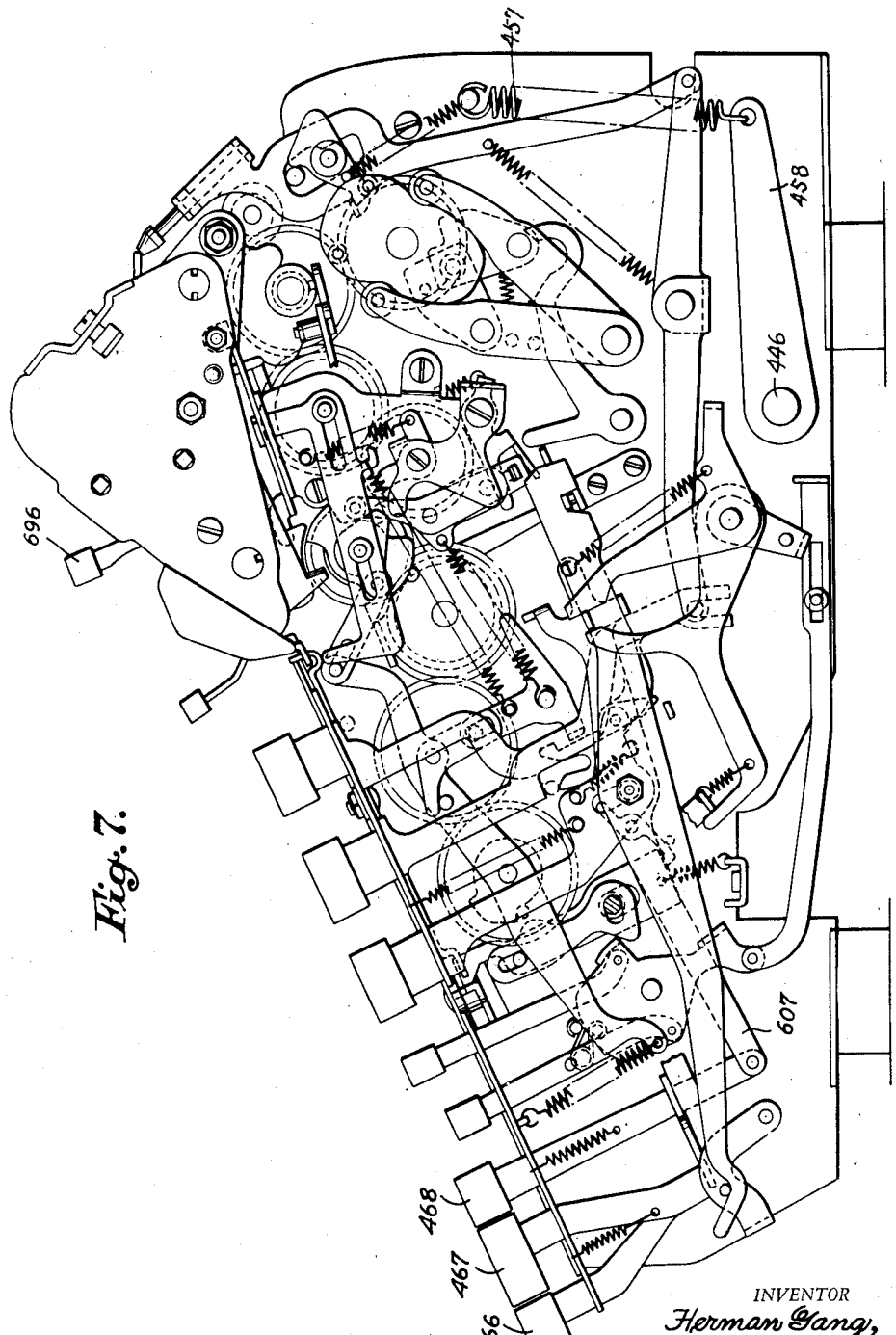
Figure 7 is a right side elevation of the machine, with the casing removed.
Figure 11:
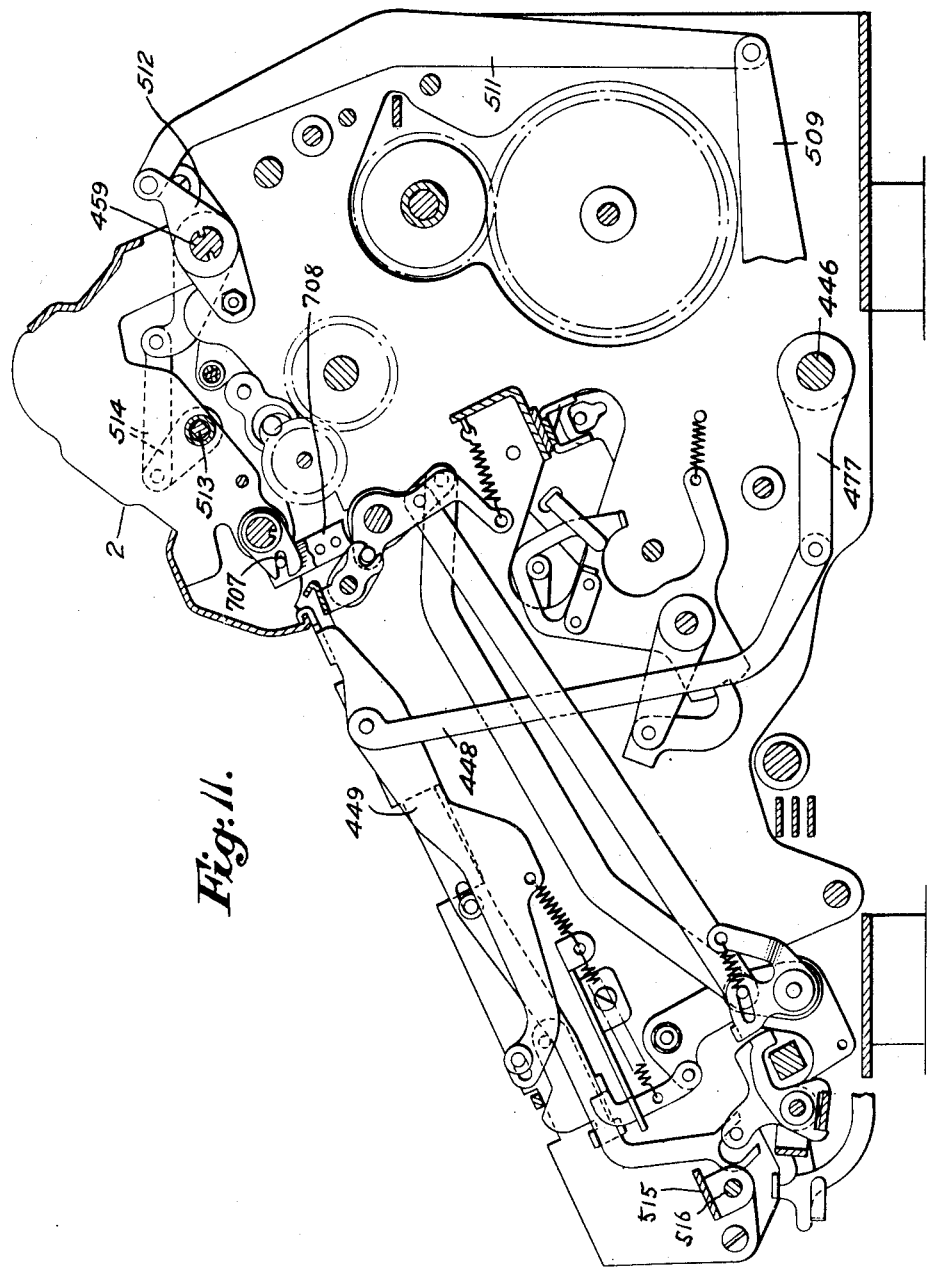
Figure 11 is a vertical section of the machine taken just inside the left hand side frame, showing certain linkage for the clearout mechanism and means for raising and lowering the main carriage.

As it is necessary that the intermediate gears in the carriage be out of mesh with the intermediate gears in the machine body (Fig. 3) when wheels 13 are cleared, a clearout cycle of clutch 464 operates to raise the forward end of the carriage. A cam 522 (Fig. 14) rotated with the driven member of clutch 464 serves to depress an arm 523 at the beginning of a clearout cycle. Arm 523 is fast on shaft 446 and as said shaft is rocked counterclockwise, the carriage 2 is lifted through pairs of arms 447, links 448 and lifters 449; one each of which is shown in Fig. 11. As clutch 464 approaches its full cycle position, arm 523 is allowed to move upwardly as spring 457 connected to arm 458 (Fig. 7) pulls the carriage downwardly into its normal position.

Figure 2:
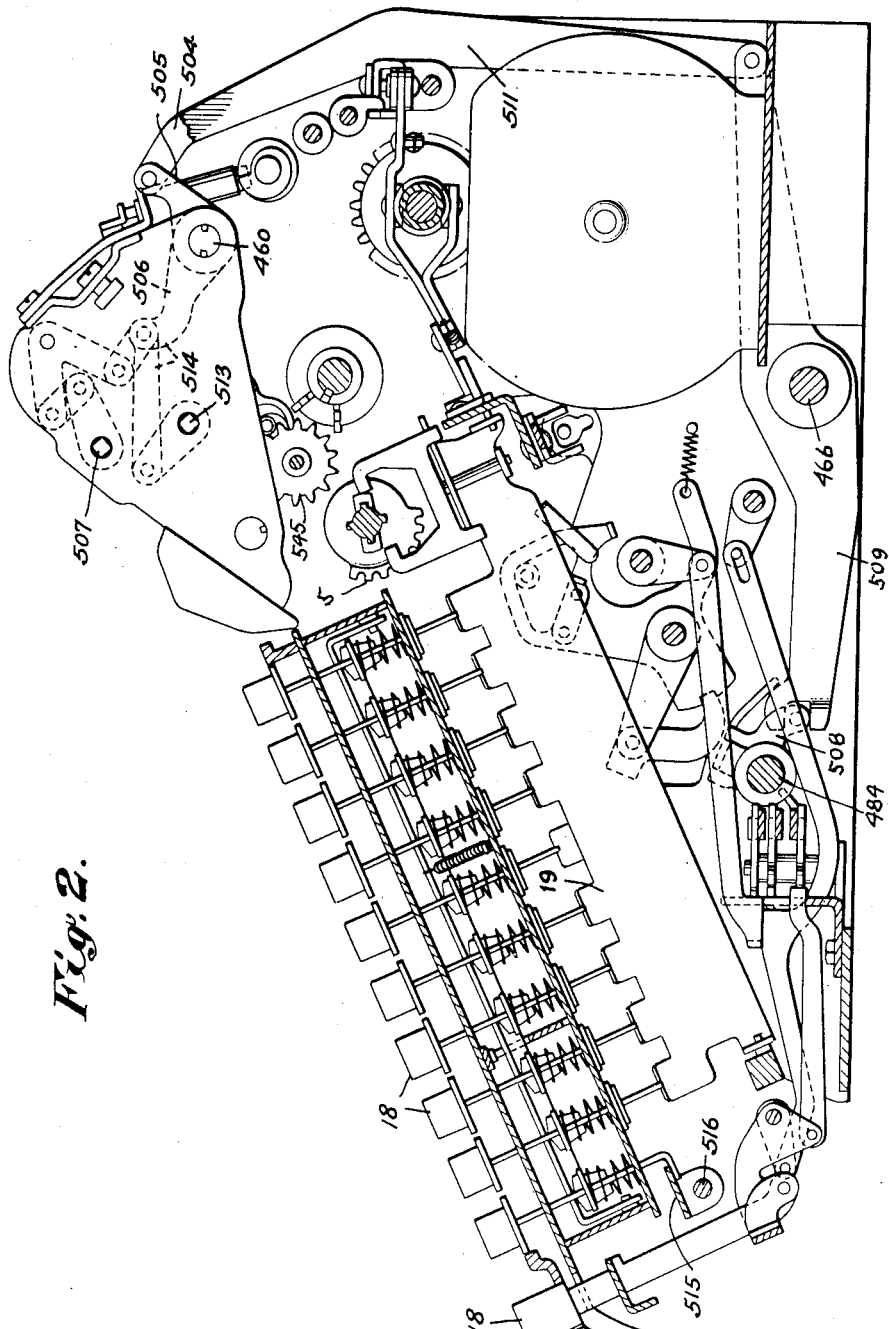
Figure 2 is a vertical section of the machine showing the keyboard and the clearout mechanisms.

The depression of the clearout key 466 will initiate the operation to clear the keyboard 18 of values which may be set up by depressed keys 18 as follows:

The keyboard construction is of the well-known type in which a set key 18 in any order is latched in depressed position by a bail 432 (Fig. 13), and in which the depression of another key in that order will move the bail to release the set key, the key which is now depressed being in turn latched in set position by said bail. Accordingly, provision is made to simultaneously depress the row of keys 18 extending across the front of the keyboard, one being provided for each order. Depression of these keys 18, which designate a zero value, serves only to move the bails 432, thereby releasing the set keys in each order thus allowing the setting slides 19 (Fig. 2) to return to normal and thus remove the values which may be set up on the actuators 5. The stem of each of the zero keys 18 terminates at its lower end in a horizontally disposed portion (Fig. 2). Extending across the machine is a bail 515 pivotally mounted on a shaft 516. The rearward edge of bail 515 overlies the horizontal lower ends of the zero keys 18 and is in contact therewith when the keys are in released position. Thus, it will be seen that when bail 515 is rocked clockwise, the zero keys 18 will be depressed, thereby releasing the value keys 18 which may be set in each order. The zero keys 18 will then be held in latched position by the bails 432 (Fig. 13). The bail 515 is provided at its right hand end with a depending arm 517 (Fig. 10) adjacent the inner wall of the right hand side frame. A push link 518 is pivotally connected to the arm 517 and extends rearwardly and in sliding contact with the inner wall of the right hand side frame. Mounted on the rear end of link 518 is a stud 519 extending through a horizontally disposed slot in the side frame and provided with an enlarged head which prevents lateral displacement of the link 518. The stud 519 is normally urged against the rear end of the slot in the side frame by a spring 520 (Fig. 10) through link 518 which is attached to the lower end of arm 517 of bail 515, thus maintaining said bail in its normal unrocked position. The shaft 484 extends through the right hand side frame externally thereof and is provided with an end portion, the sides of which are flattened to provide rotary drive to a member 521 (Figs. 10 and 20) slidably mounted thereon. Member 521 is provided with an upstanding lug 521' normally positioned to the right and rear of the head of stud 519 (Fig. 18).

Clearout slide 478 extends to the right beyond the side frame and terminates in a rearward projection provided with a slot which engages a rim of member 521. Therefore, when the clearout key 466 is depressed and slide 478 moved to the left, the lug 521' of the member 521 will be brought into the plane of the head of stud 519. As the shaft 484 is rocked counterclockwise by action of clearout clutch 464, member 521 is also rocked and lug 521' will contact the head of stud 519 moving it forward in the slot in the side frame. Thus bail 515 is rocked to clear the keyboard through arm 517 and push link 518 on the rear end of which the stud 519 is mounted. Thus means controlled by one, two or all of the clear keys 465, 466, 467 will render the related clearing means operable and will close the clutch 464 in train with the motor, inasmuch as the depression of a clear key or keys will release the latch 482, thereby releasing the slide 480 and closing said clutch; said latch, said slide and said clutch being common to and controlled by any one, two, or all three of said clear keys.

Multiplier storage devices

In the specific embodiment of the invention herein disclosed, the multiplier storage devices including wheels 524 and gears 540 (Figs. 3, 13 and 15) are shown mounted in a sub-carriage 525. Sub-carriage 525 is mounted on a splined shaft 527 which is located in the front and extends the length of main carriage 2. Shaft 527 is provided with suitable bearings in the end plates of the main carriage and is thereby adapted for rocking movement as will hereinafter appear. Sub-carriage 525 and the multiplier storage devices contained therein is adapted for longitudinal movement relative to main carriage 2 as shown in Fig. 15 and as fully disclosed in my co-pending applications, Serial Nos. 8,546 and 8,547, filed of even date herewith said application, Serial No. 8,546, being continued in application Serial No. 57,943, filed November 2, 1948. The relative movement of the sub-carriage and storage devices to the main carriage, however, forms no part of the invention disclosed herein. Therefore, for the purposes of the present disclosure, the sub-carriage and storage devices are to be considered as fixed with respect to longitudinal movement in the normal rightmost position as shown in Fig. 13. Furthermore, it will readily be seen from the foregoing that the multiplier storage devices may be directly mounted in the main carriage and in fixed relationship thereto with respect to longitudinal movement.

The denominational series of multiplier storage wheels 524 (Figs. 4 and 15) are located at the front of sub-carriage 525 and are fixed to gears 536 to the left thereof by suitable rivets. Wheels 524 and gears 536 are rotatably mounted as units on sleeves which are provided with gears 537 integral therewith and located to the right of said wheels. Gears 537 are normally held in fixed relationship to wheels 524 by centralizing springs 538 (Figs. 4 and 6) whereby gears 537, wheels 524 and gears 536 are normally adapted to be rotated as units on a shaft 539 extending the length of sub-carriage 525. Located to the rear and in constant mesh with gears 536 (Figs. 4 and 13) are the multiplier storage gears 540 which are rotatably mounted on splined shaft 527.

Figure 22:
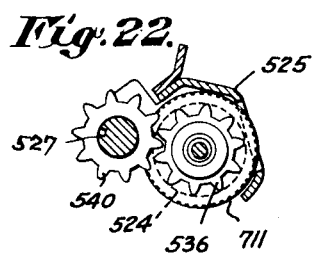
Figure 22 is a detail vertical section, showing a storage device and a twirler knob for the adjustment thereof.

A multiplier may be set in storage wheels 524 and gears 540 in any suitable manner; for instance, as fully disclosed in my co-pending application, Serial No. 8,547 filed of even date herewith. However, as the set-up means forms no part of the present invention, a manually operable and simplified means is shown in Fig. 22. Each storage wheel 524 is provided with a twirler knob 711 integral therewith. The twirler knobs are of slightly larger diameter than wheels 524 and thereby extend outwardly through suitable openings a slight distance exteriorly of the front of sub-carriage 525 so that they are accessible for manipulation. The peripheries of the twirler knobs are provided with knurling, as shown in Fig. 22, for ease of operation, and suitable openings (Figs. 1 and 15) are provided in the sub-carriage so that the operator may observe the settings of the storage wheels.

Storage wheels 524 and gears 540 are held in adjusted position by click pawls 693, pivotally mounted on shaft 539 and located to the left of gears 536 (Fig. 4). Click pawls 693 are biased counterclockwise (Fig. 3) (clockwise, Fig. 5) by a spring 694 extending the length of sub-carriage 525 and threaded through suitable openings in the partition plates thereof, and said pawls are provided with square lugs (Fig. 3) extending to the side from the ends thereof and adapted for engagement with the teeth of storage gears 540. Said pawls 693 thus constitute spring-urged detent means for the gears 540. Cams 695 are splined on shaft 527 and are normally in counterclockwise position from the showing in Fig. 5 and when in normal position allow engagement of the lugs of pawls 693 with storage gears 540 (Fig. 3). However, as will be described, when carriage 2 is rocked in any one of the clearout operations, splined shaft 527 and cams 695 are rocked clockwise (Fig. 5) thereby rocking pawls 693 counterclockwise and out of engagement with gears 540.

The multiplier storage devices are adapted for operation in connection with the control of a program of multiplication in which the set storage devices are successively counted back to zero. Such a program of multiplication is fully disclosed in my co-pending application, Serial No. 8,548, filed of even date herewith. The particular multiplication control means, however, which operate in the counting out of the storage devices form no part of the present invention, and the invention is therefore not restricted to use with the mechanism disclosed in the abovementioned co-pending application.

In accordance with the aforesaid co-pending application, storage gears 540 are provided with rightwardly extending hubs 541 (Figs. 4 and 13) terminating in end portions of slightly larger diameter. The hubs 541 are provided with recesses 542 (Fig. 3) which are adapted for registration with fingers 543 which are rotatably mounted on shaft 539. When a value is set in a storage wheel 524 and gear 540, the cooperating finger 543 will ride on the periphery of its hub 541, and when the storage wheel and gear stand at zero the finger will be urged into the recess 542. The storage wheels 524 and gears 540 are successively counted back to zero by a counting finger 626 (Fig. 3) starting with the rightmost wheel and gear with main carriage 2 in its leftmost position.

Figure 8:
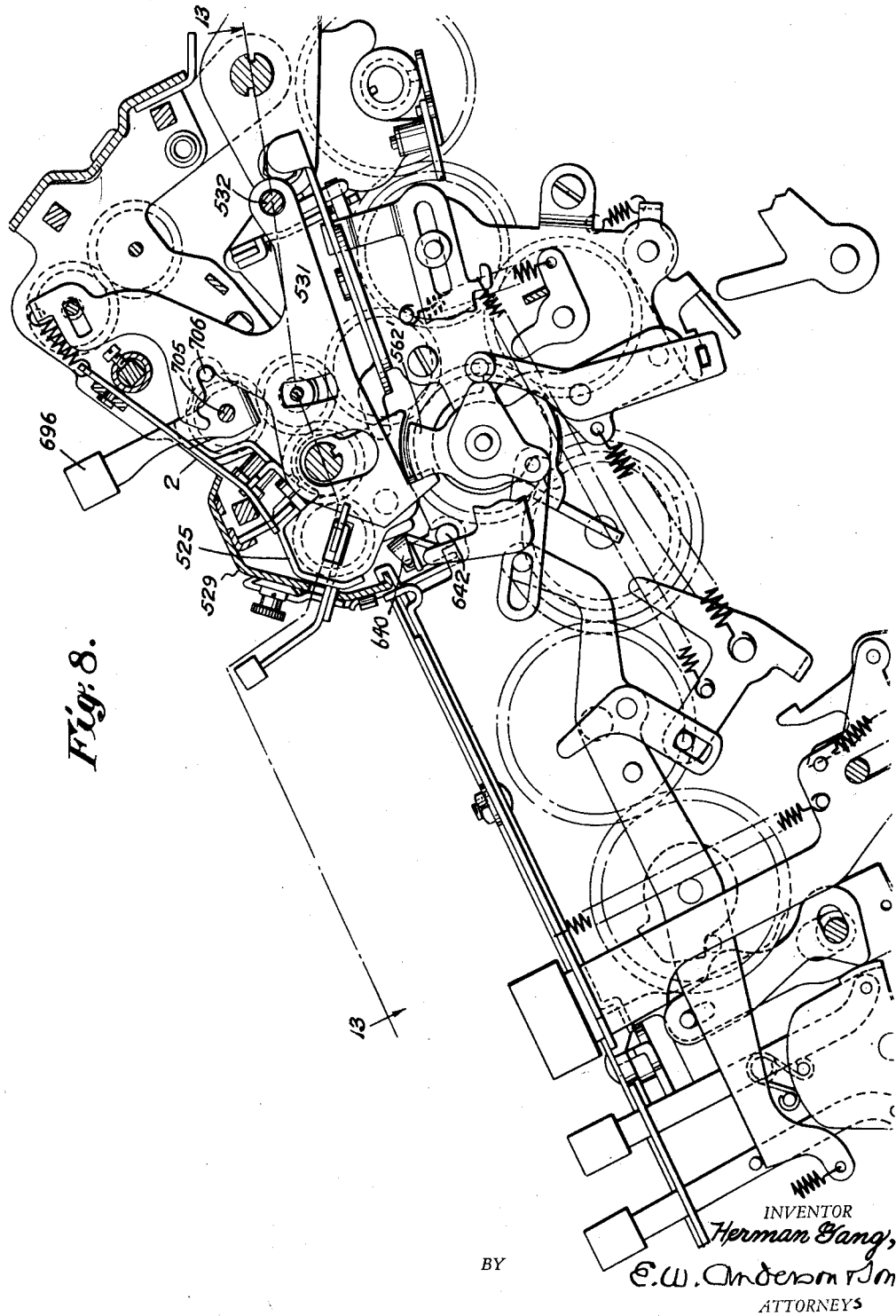
Figure 8 is an enlarged right side elevation of the machine with the main carriage in section, showing the constant multiplier key and parts associated therewith.
Figure 21:
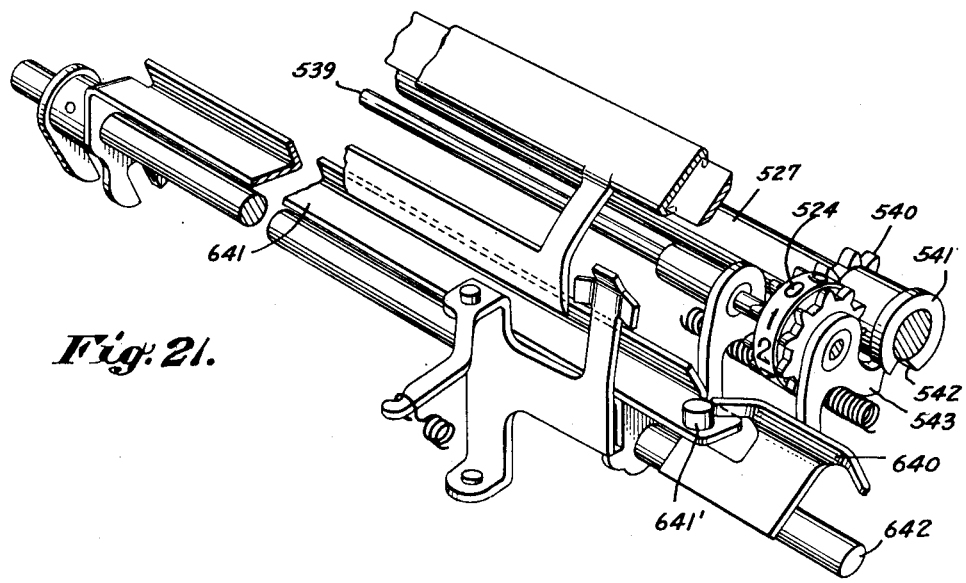
Figure 21 is a fragmentary perspective view, showing a multiplier storage gear and wheel and parts associated therewith.

A bail 640 (Figs. 3, 8 and 21) pivotally mounted in the main body of the machine controls registration and right carriage shift. Depending arms of fingers 543, which are in contact with the respective hubs 541 of storage gears 540, are successively brought into registration with bail 640 which is spring urged in a clockwise direction.

If there is a value in the storage gear, the arm of finger 543 will move bail 640 in a counterclockwise direction (Fig. 21) indicating registration. When the storage gear 540 is counted back to zero by finger 626, finger 543 will be brought into registration with recess 542, thereby allowing bail 640 to be moved by its spring in clockwise direction to initiate a right carriage shift.

A second bail 641 (Fig. 21) pivotally mounted on the same shaft with bail 640 serves to stop the machine when the last storage gear 540 containing a value is counted back to zero. Bail 641 is adapted for engagement with the depending arms of pawls 543 related to all of the storage devices to the left of the one in engagement with bail 640. Thus, if there is a value in any one of the storage gears, bail 641 will be held against the tension of a suitable spring in counterclockwise direction and the operation of the machine will continue; either for registration or carriage shift. Furthermore, bail 640 is provided with a leftward extension which by contact with a pin 641' of bail 641 (Fig. 21) will hold said bail in counterclockwise position if bail 640 is so held by finger 543, thus continuing the operation of the machine. When all of the storage devices, however, are counted back to zero, bail 641 will be allowed clockwise movement and the machine will be brought to rest.

From the foregoing, it will be seen that at the termination of the calculation, fingers 543 will be within the respective recesses 542 of the storage devices and held therein by bails 640 and 641 which are spring held in their clockwise positions. As fully disclosed and for reasons set forth in the referred to co-pending application, Serial No. 8,548, provision is made for rocking bails 640 and 641 in counterclockwise direction during any one of the clearout operations. It will be apparent, therefore, that when the bails are so rocked counterclockwise, fingers 543 will no longer be urged within recesses 542 and will therefore exert no restraining action against the rotation of storage gears 540. As will presently appear, the release of fingers 543 by bails 640—641 is necessary for the operation of the devices of the invention when used in connection with the particular multiplication control as disclosed in the aforesaid co-pending application.

*Restoring multiplier values*

In accordance with the invention, the setting of a lever 696 (Figs. 1, 8, 15 and 16) after a multiplier is set in the storage devices, provides for the return of the multiplier to the devices during a clearout operation initiated after the completion of the calculation. As described in the foregoing, carriage 2 is raised during any one of the clearout operations and it is this movement which effects the return of the multiplier to the storage devices. As described in connection with the clearout devices, the clearout operations for the multiplier dials, product dials and the keyboard may be effected by a single operation of clearout clutch 464 which is initiated by simultaneous depression of clear keys 465, 466 and 467. Therefore, as it is desirable to clear the machine for another calculation, the preferred operation is to effect the return of the multiplier to the storage devices by the simultaneous clearout operation, although any one of the clearout operations will effect the return. The operation is effected as follows:

Multiplier storage wheels 524, gears 536 fixed thereon, and gears 537 having the stated spring connections 538 therewith (Figs. 4 and 6) are normally adapted to be rotated as units. The ends of centralizing springs 538 have driving attachment respectively with pins extending inwardly from wheels 524 and gears 537. As viewed in Fig. 6, wheels 524 and gears 537 are biased in clockwise and counterclockwise directions respectively with the pins thereof in restraining engagement. It will be apparent, therefore, if gears 537 are held against rotation, wheels 524 may be moved in counterclockwise direction thus adding tension to springs 538, and that if then wheels 524 are released, springs 538 will drive said wheels back in clockwise direction to their original setting. To lock gears 537 against rotation, a comb 697 (Fig. 3, 15 and 16) is adapted to be moved into locking engagement with gears 537 upon setting of lever 696 after a multiplier has been set in the storage devices.

Comb 697 mounted in carriage 2 extends longitudinally thereof and is located to the rear of gears 537 and above storage gears 540 (Figs. 3, 15 and 16). As most clearly seen in Fig. 16, comb 697 is provided with teeth 697' which are normally located to the right rear and out of contact with gears 537. The leftmost end of comb 697 extends outwardly through a suitable slot in the end plate of carriage 2 and is thereat provided with an open-end slot 698' extending to the rear at an angle towards the right of the forward edge of the comb. A guide pin 698 secured by a suitable bracket to the end plate of carriage 2, extends downwardly through said slot and the comb is held in normal position by arms 699 and 700 which extend upwardly on either side of the end of comb 697 said arms being provided each with a suitable ear to which is attached the respective ends of a spring 701. Spring 701 biases arms 699—700 towards each other and normally in contact with either side of a stop 702 comprising the inwardly turned lug of a plate fast on the end of shaft 527. Thus comb 697 is normally located in the position indicated in Fig. 16 and teeth 697' out of engagement with gear 537.

The rightmost end of comb 697 is pivotally mounted and supported on a lever 703 (Figs. 15 and 16) which is fulcrumed on a suitable bracket attached to a partition plate of carriage 2 to the left of and in spaced relationship to setting plate 531 (to be described). It will be apparent, therefore, from an inspection of Figs. 15 and 16, that if lever 703 is rocked in a clockwise direction, the rightmost end of comb 697 will be moved forward and towards the left and that due to guide pin 698 mounted upon the carriage frame and in registration with the angularly disposed cam slot 698' in comb 697 the leftmost end of the comb will be moved forward to the same extent. Thus the cam slot 698' in comb 697 and the pin 698 mounted upon the carriage frame and engaging said slot constitute a cam device rendered effective upon manipulation of constant lever 696 to adjust said comb 697 in parallel with said gears 537. The pin 698 is mounted upon bracket 698'' secured to the leftmost end of the carriage frame. The movement of comb 697 will therefore rock arm 700 clockwise as shown in Fig. 17 against the tension of spring 701. Thus the teeth 697' of comb 697 will be moved into engagement with gears 537, thereby locking said gears against rotation. It will be noted that a latch 704 is shown in engagement with a rightwardly extending arm of lever 703 whereby the lever is latched against the above stated movement. However, when sub-carriage 525 is in its normal rightmost position in latched connection with setting plate 531 the end of the sub-carriage 525 will be in engagement with the end of latch 704 thereby holding it out of engagement with lever 703. This provision is made so that when sub-carriage 525 is moved longitudinally of the main carriage 2 as fully described in my hereinbefore noted co-pending application, Serial No. 57,043, filed on November 2, 1948, comb 697 will be latched against such movement for engagement with gears 537 as would cause interference with the longitudinal movement of the sub-carriage.

Lever 696 is fulcrumed on shaft 705, on which product-dividend wheels 13 are also mounted, and is provided with an upstanding arm 696' (Figs. 15 and 16) which is adapted for engagement with a cam edge at the rear of lever 703. Thus when lever 696 is adjusted towards the front of the machine to its effective position after a multiplier is set in the storage devices, arm 696' will rock lever 703 clockwise and thereby move comb 697 towards the front and left of the machine and therefore move teeth 697' into locking engagement with the respective gears 537.

Lever 696 is further provided with a rearwardly extending arm on which is mounted pin 706 extending to the right thereof. Pin 706 is adapted for engagement with either of two indents in setting plate 531 (Figs. 8 and 16) and is thereby held in either of its adjusted positions. Furthermore, pin 706 serves to locate setting plate 531 in either its effective or ineffective position. When lever 696 is in its normal position (Fig. 8), pin 706 serves to locate setting plate 531 in counterclockwise position with the nose at the forward end thereof lowered into position for engagement with cam 562', the operation of which is fully disclosed in my co-pending application, Serial No. 8,547, entitled "Multiplier and Dividend Set-Up Mechanism." However, when lever 696 is rocked towards the front of the machine, thus moving pin 706 into engagement with the forward indent of plate 531, the setting plate will be rocked clockwise, thereby raising the nose thereof out of position to be engaged by cam 562'. It will be apparent, therefore, that when lever 696 is set to provide for a constant multiplier, inadventent operation of the set-up mechanism will be ineffective to cause a registration in the multiplier storage devices.

Storage gears 540 and wheels 524 will be held in position by pawls 693 as they are successively counted back to zero during the calculation. It will, therefore, be apparent that as gears 537 are held against rotation, springs 538 will be further tensioned, thus biasing wheels 524 and gears 540 in reverse direction. With the calculation concluded, the operation of the clearout devices will release finger 543 and raise the carriage 2 as described. When carriage 2 is raised, provision is made to rock shaft 527, thereby removing pawls 693 from restraining engagement with gears 540 in the following manner.

Crank arm 707 (Figs. 11, 15 and 16) is splined on shaft 527 and extends forwardly between two spaced plates 708 which are mounted on and extend upwardly from the left hand side frame. Plates 708 are provided with a pin extending therebetween and through an open-end slot in the free end of crank arm 707. Crank arm 707 is, therefore, held against lateral movement by plates 708 when carriage 2 is shifted. However, when carriage 2 is raised (rocked) in the keyboard clearout operation, the pin in engagement with the slot of crank arm 707 will hold the crank arm against movement. Therefore, as shaft 527 is raised with carriage 2, crank arm 707 will be rocked counterclockwise (Figs. 11 and 16) and due to the splined connection with shaft 527 will rock the shaft in like direction.

As shaft 527 is rocked in accordance with the foregoing, cams 695 splined thereon will be rocked counterclockwise (Fig. 5) to the position shown therein and into contact with pawls 693 thereby rocking the pawls out of engagement with storage gears 540. As heretofore noted with reference to co-pending Application Serial No. 8,548, bails 640—641 are rocked counterclockwise (Fig. 21) during any one of the clearing operations, thus allowing fingers 543 to be moved from engagement with the recesses 542 of the hubs 541 of storage gears 540. Therefore, as storage gears 540 are freed from restraint by pawls 693 and fingers 543, springs 538 will drive storage wheels 524 clockwise and storage gears counterclockwise (Fig. 3) to their original settings. It will be apparent that when carriage 2 is lowered to its normal position at the end of the clearing operation, shaft 527 will be rocked back to normal, thus allowing pawls 693 to be moved back into engagement with storage gears 540. Also bails 640—641 will be moved into contact with fingers 543, thus urging them into engagement with hubs 541 of the storage gears. When constant lever 696 is moved back to normal, arm 696' thereof will be removed from contact with lever 703. Arm 700 (Fig. 16) in contact with the end of comb 697 and biased in counterclockwise direction by spring 701 will, therefore, move comb 697 from engagement with gears 537 to its normal position.

When constant lever 696 is in normal unset position, the operation of the clearout mechanism is also adapted to move comb 697 into locking engagement with gears 537 for reasons in connection with a multiplying program initiated upon depression of a multiplier key 587 (Fig. 1). As fully disclosed in the abovementioned co-pending application, Serial No. 8,548, a program of multiplication initiated upon depression of multiplier key 587 includes a clearout operation preceding the calculation for product-dividend wheels 13 and multiplier quotient wheels 85. It will be apparent, therefore, that when carriage 2 is raised during the clearout operation, shaft 527 and cams 695 (Fig. 5) will be rocked, thereby moving pawls 693 from engagement with storage gears 540, and bails 640—641 (Fig. 3) will also be moved, thereby releasing fingers 543 from engagement with hubs 541 of the storage gears. As shaft 527 is rocked, plate 702 fixed to the end thereof will also be rocked clockwise from the position shown in Fig. 17. The lug of plate 702 will, therefore, rock arm 700 clockwise and arm 699 will also be moved clockwise by spring 701, thus moving comb 697 to engage the teeth 697' thereof with gears 537. When carriage 2 is lowered at the end of the clearout operation, pawls 693 and fingers 543 will be reengaged with the gears 540 and hubs 541 respectively. Thus, it will be seen that the storage devices will be prevented from moving from their adjusted positions during the clearout operation.

For subject matter herein disclosed and not claimed, reference is made to applicant's co-pending applications, Serial No. 8,544 relating to carriage tabulating means and shift direction control; Serial No. 8,547 relating to multiplier and dividend entering means; Serial No. 8,548 relating to registration and shift control; and Serial No. 57,943, relating to product transfer means.

I claim:

1. In a calculating machine, the combination of a denominationally shiftable rockable carriage, multiplier storage devices and a product register thereon, said storage devices each comprising a spring-connected gear couple, transmission gears on the fixed frame meshing with gears of said register, and means for returning multiplier values to said storage devices for use as a constant factor in a multiplication program and for simultaneously clearing said register comprising power means for rocking said carriage and effecting the operation of said clearing means and the disengagement of the register gears from the fixed frame gears, said power means having a normally ineffective clutch interposed in the drive, means comprising a key for engaging said clutch and for rendering said clearing means operative, a detent comb for engaging one gear of each couple to retain multiplier values entered therein, means for successively counting back to zero and building up tension in said spring connections against the other gears of the couples during a multiplication calculation, detent pawls engaging the other gears of the couples to hold them against said spring tension, and means for releasing said pawls from said other gears upon the rocking of the carriage, said built up spring tension thereupon acting to effect the return of the multiplier values to the storage devices.

2. In a calculating machine, the combination of a denominationally shiftable rockable carriage, a keyboard, multiplier storage devices, a product register and a multiplier register on the carriage, said storage devices each comprising a spring-connected gear couple, transmission gears on the fixed frame meshing with gears of said product register, and means for returning multiplier values to said storage devices for use as a constant factor in a multiplication program and for simultaneously clearing said keyboard and said registers singly or collectively comprising power means for rocking said carriage and effecting the operation of said clearing means and the disengagement of the product register gears from the fixed frame gears, said power means having a normally ineffective clutch interposed in the drive, means comprising clear keys for engaging said clutch and rendering said clearing means operative singly or collectively, a detent comb for engaging one gear of each couple to retain multiplier values entered therein, means for successively counting back to zero and building up tension in said spring connections against the other gears of the couples during a multiplication calculation, detent pawls engaging said other gears to hold them against said spring tension, and means for releasing said pawls from said other gears upon the rocking of the carriage, said built up spring tension thereupon acting to effect the return of multiplier values to said storage devices.

3. In a calculating machine, the combination of a denominationally shiftable rockable carriage, a keyboard, multiplier storage devices, a product register and a multiplier register on the carriage, said storage devices each comprising a spring-connected gear couple, transmission gears on the fixed frame meshing with gears of said product register, and means for returning multiplier values to said storage devices for use as a constant factor in a multiplication program and for simultaneously clearing said keyboard, said product register and said multiplier register singly or collectively comprising power means for rocking said carriage and effecting the operation of said clearing means and the disengagement of the product register gears from the fixed frame gears, said power means having a normally ineffective one-cycle clutch interposed in the drive, means comprising clear keys for engaging said clutch and rendering said clearing means operative, to singly or collectively clear the keyboard, the product register and the multiplier register, latch means for holding said clearing means in operative position, a detent comb for engaging one gear of each said couple to retain multiplier values entered therein, means for successively counting back to zero and building up tension in said spring connections against the other gears of the couples during a multiplication calculation, detent pawls engaging said other gears to hold them against said spring tension, means for releasing said pawls from said other gears upon the rocking of the carriage, said built up spring tension thereupon acting to effect the return of the multiplier values to said storage devices, and means for restoring the parts to normal position at the end of a clutch cycle.

4. In a motor driven calculating machine, the combination of a denominationally shiftable carriage capable of being raised with respect to the fixed frame of the machine, a register and denominational multiplier storage devices on said carriage, said register having movement transmission gears, each storage device comprising a gear couple the gears of which have a spring connection, transmission gears on the fixed frame meshing with said register gears, means for setting a multiplier value in each storage device for use as a constant factor in a program of multiplication, means engageable with one gear of each couple to hold it against rotation, means for successively zeroizing said storage devices and building up tension in said spring connections in said multiplication program comprising spring-urged detent means for the other gears of said couples, a manipulable key, means controlled by said key and in train with the motor for raising the carriage to unmesh said transmission gears, means operable by said carriage upon raising thereof to release said detent means, and means comprising said spring connections for returning the multiplier value to said storage devices upon release of said detent means.

5. In a motor driven calculating machine, the combination of a denominationally shiftable carriage capable of being raised with respect to the fixed frame of the machine, a product register and denominational multiplier storage devices on said carriage, said register having movement transmission gears, each storage device comprising a gear couple the gears of which have a spring connection, transmission gears on the fixed frame meshing with said register gears, means for setting a multiplier value in each storage device for use as a constant factor in a program of multiplication, means engageable with one gear of each couple to hold it against rotation, means for successively zeroizing said storage devices and building up tension in said spring connections in said multiplication program comprising spring-urged detent means for the other gears of said couples, means for clearing said register comprising a manipulable key, means controlled by said key and in train with the motor for raising the carriage to unmesh said transmission gears and for operating said clearing means, means operable by said carriage upon raising thereof to release said detent means, and means comprising said spring connections for returning the multiplier value to said storage devices simultaneously with the operation of said clearing means upon release of said detent means.

6. In a motor driven calculating machine, the combination of a denominationally shiftable carriage capable of being raised with respect to the fixed frame of the machine, a register and denominational multiplier storage devices on said carriage, said register having movement transmission gears, each storage device comprising a gear couple the gears of which have a spring connection, transmission gears on the fixed frame meshing with said register gears, means for setting a multiplier value in each storage device for use as a constant factor in a program of multiplication, means engageable with one gear of each couple to hold it against rotation, means for successively zeroizing said storage devices and building up tension in said spring connections in said multiplication program comprising spring-urged detent pawls for the other gears of said couples, a manipulable key, means controlled by said key and in train with the motor for raising the carriage to unmesh said transmission gears, and means for returning the multiplier value to said storage devices comprising a rock-shaft having bearings in the carriage frame and crank connection with the fixed frame and cams splined on said rock-shaft, said cams engaging said pawls upon raising the carriage to release said pawls against the tension of their springs.

7. In a motor driven calculating machine, the combination of a denominationally shiftable carriage capable of being raised with respect to the fixed frame of the machine, a register and denominational multiplier storage devices on said carriage, said register having movement transmission gears, each storage device comprising a gear couple the gears of which have a spring connection, transmission gears on the fixed frame meshing with said register gears, means for setting a multiplier value in each storage device for use as a constant factor in a program of multiplication, an adjustable comb the teeth of which are respectively engageable with one gear of each couple to hold it against rotation, a manipulatable device at one end of the carriage for adjusting said comb into engagement with said gears including means at the other end of the carriage rendered effective upon manipulation of said device to adjust said comb in parallel with said gears and to disengage said comb upon retraction of said device, means for successively zeroizing said storage devices in said multiplication program and building up tension in said spring connections when said comb is engaged comprising spring-urged detent means for the other gears of said couples, a manipulable key, means controlled by said key and in train with the motor for raising the carriage to unmesh said transmission gears, means operable by said carriage upon raising thereof to release said detent means, and means comprising said spring connections for returning the multiplier value to said storage devices upon release of said detent means.

8. In a motor driven calculating machine, the combination of a denominationally shiftable carriage capable of being raised with respect to the fixed frame of the machine, a register and denominational multiplier storage devices on said carriage, said register having movement transmission gears, each storage device comprising a gear couple the gears of which have a spring connection, transmission gears on the fixed frame meshing with said register gears, means for setting a multiplier value in each storage device for use as a constant factor in a program of multiplication, a comb the teeth of which are respectively engageable with one gear of each couple to hold it against rotation, means for adjusting said comb into and out of engagement with said gears, means for successively zeroizing said storage devices in said multiplication program and building up tension in said spring connections comprising spring-urged detent pawls for the other gears of said couples, a manipulable key, means controlled by said key and in train with the motor for raising the carriage to unmesh said transmission gears, and means for returning the multiplier value to said storage devices upon raising the carriage comprising a rock-shaft having bearings in the carriage frame and crank connection with the fixed frame and cams splined on said rock-shaft, said cams engaging said pawls upon raising the carriage to release said pawls against the tension of their springs, said means for adjusting said comb comprising a lever device at one end of the carriage, a cam device at the other end of the carriage rendered effective upon manipulation of said lever device, a stop fast to one end of said rock-shaft, and arms loosely mounted upon said rock-shaft, said arms having spring connection to hold them in contact with opposite edges of said stop and of said comb, one of said arms being yieldable against the tension of said spring connection upon adjustment of said comb and serving to return the comb to normal position upon retraction of said lever device.

9. In a motor driven calculating machine, the combination of a denominationally shiftable carriage capable of being raised with respect to the fixed frame of the machine, a product register and denominational multiplier storage devices on said carriage, said register having movement transmission gears, each storage device comprising a gear couple the gears of which have a spring connection, transmission gears on the fixed frame meshing with said register gears, means for setting a multiplier value in each storage device for use as a constant factor in a program of multiplication, a comb the teeth of which are respectively engageable with one gear of each couple to hold it against rotation, means comprising a manipulable device for adjusting said comb into and out of engagement with said gears, means for successively zeroizing said storage devices and building up tension in said spring connections in said multiplication program comprising spring-urged detent pawls for the other gears of said couples, means for clearing said register comprising a one-cycle clutch in train with the motor, a manipulable key, means controlled by said key for rendering said clearing means motor-operable and for closing said clutch and means controlled by said clutch for operating said clearing means and for raising the carriage to unmesh said transmission gears, and means for returning the multiplier value to said storage devices simultaneously with the operation of said clearing means comprising a rock-shaft having bearings in the carriage frame and crank connection with the fixed frame and cams splined on said rock-shaft, said cams engaging said detent pawls upon raising the carriage to release said pawls against the tension of their springs.

10. In a motor driven calculating machine, the combination of a denominationally shiftable carriage capable of being raised with respect to the fixed frame of the machine, a product register, a multiplier register and denominational multiplier storage devices on said carriage, said product register having movement transmission gears, each storage device comprising a gear couple the gears of which have a spring connection, transmission gears on the fixed frame meshing with said register gears, means for setting a multiplier value in each storage device for use as a constant factor in a program of multiplication, a comb the teeth of which are respectively engageable with one gear of each couple to hold it against rotation, means comprising a manipulable device for adjusting said comb into and out of engagement with said gears, means for successively zeroizing said storage devices and building up tension in said spring connections in said multiplication program comprising spring-urged detent pawls for the other gears of said couples, a keyboard, clearing means for the keyboard, clearing means for the product register and clearing means for the multiplier register comprising a one-cycle clutch in train with the motor, a clear key for the keyboard, a clear key for the product register, a clear key for the multiplier register, means controlled by any one, two or all of said clear keys for rendering the related clearing means motor-operable and for closing said clutch and means controlled by said clutch for operating the clearing means and for raising the carriage to unmesh said transmission gears, and means for returning the multiplier value to said storage devices simultaneously with the operation of said clearing means comprising a rock-shaft having bearings in the carriage frame and crank connection with the fixed frame and cams splined on said shaft, said cams engaging said detent pawls upon raising the carriage to release said pawls against the tension of their springs.

11. In a motor driven calculating machine, the combination of a denominationally shiftable carriage capable of being raised with respect to the fixed frame of the machine, a product register and denominational multiplier storage devices on said carriage, said register having movement transmission gears, each storage device comprising a gear couple the gears of which have a spring connection, transmission gears on the fixed frame meshing with said register gears, means for setting a multiplier value in each storage device for use as a constant factor in a program of multiplication, a comb the teeth of which are respectively engageable with one gear of each couple to hold it against rotation, means comprising a manipulable device for adjusting said comb into and out of engagement with said gears, means for successively zeroizing said storage devices and building up tension in said spring connections in said multiplication program comprising spring-urged detent pawls for the other gears of said couple, means for clearing said register comprising a one-cycle clutch in train with the motor, a clear key, a rock-shaft operable by said clutch, an adjustable spring-retracted slide, a latch settable to hold said slide in adjusted position against the tension of its spring, means controlled by said key for adjusting said slide, setting said latch and engaging said clutch, means controlled by said slide for rendering the clearing means operable by said rock-shaft and means controlled by said clutch for raising the carriage to unmesh said transmission gears and for operating said rock-shaft, and means for returning the multiplier value to said storage device simultaneously with the operation of said clearing means comprising a rock-shaft having bearings in the carriage frame and crank connection with the fixed frame and cams splined on said rock-shaft, said cams engaging said detent pawls upon raising the carriage to release said pawls against the tension of their springs.

HERMAN GANG.

REFERENCES CITED

The following references are of record in the file of this patent:

UNITED STATES PATENTS

| Number | Name | Date |
|---|---|---|
| 1,462,059 | Britten, Jr. | July 17, 1923 |
| 2,160,361 | Hilder | May 30, 1939 |
| 2,201,713 | Britten, Jr. | May 21, 1940 |
| 2,376,997 | Friden et al. | May 29, 1945 |

FOREIGN PATENTS

| Number | Country | Date |
|---|---|---|
| 509,747 | Great Britain | July 20, 1939 |